United States Patent [19]

Wilkins

[11] 4,225,769
[45] Sep. 30, 1980

[54] PLASMA TORCH STARTING CIRCUIT

[75] Inventor: Raymond G. Wilkins, Hanover, N.H.

[73] Assignee: Thermal Dynamics Corporation, West Lebanon, N.H.

[21] Appl. No.: 836,816

[22] Filed: Sep. 26, 1977

[51] Int. Cl.² ............................................. B23K 9/06
[52] U.S. Cl. ............................... 219/130.4; 219/121 P
[58] Field of Search ............ 219/121 P, 130.4, 130.51; 361/256, 130.4

[56] References Cited

U.S. PATENT DOCUMENTS

| | | | |
|---|---|---|---|
| 3,174,027 | 3/1965 | Manz | 219/130.4 |
| 3,354,289 | 11/1967 | Haase et al. | 219/121 P |
| 3,551,741 | 12/1970 | Tajbl et al. | 219/130.4 |
| 3,637,974 | 1/1972 | Tajbl et al. | 219/130.4 |
| 3,849,670 | 11/1974 | Lourigan | 361/256 |
| 3,876,855 | 4/1975 | Hirasawa et al. | 219/130.4 |
| 4,061,899 | 12/1977 | Gillitzer et al. | 219/130.4 |

FOREIGN PATENT DOCUMENTS 2459289  6/1976  Fed. Rep. of Germany ........ 219/130.4

Primary Examiner—Roy N. Envall, Jr.
Assistant Examiner—Clifford C. Shaw
Attorney, Agent, or Firm—Sughrue, Rothwell, Mion, Zinn and Macpeak

[57] ABSTRACT

A plasma torch system is provided which creates a pilot arc having high instantaneous power and low average power. The pilot arc ignition circuit reduces the pilot arc duty cycle by pulsing on the pilot arc and then extinguishing it. A plasma torch disclosed also reduces RF noise in the line by eliminating the additional spark gap typically used in the power supply circuit and by placing the triggering circuit on or adjacent the torch handle.

8 Claims, 4 Drawing Figures

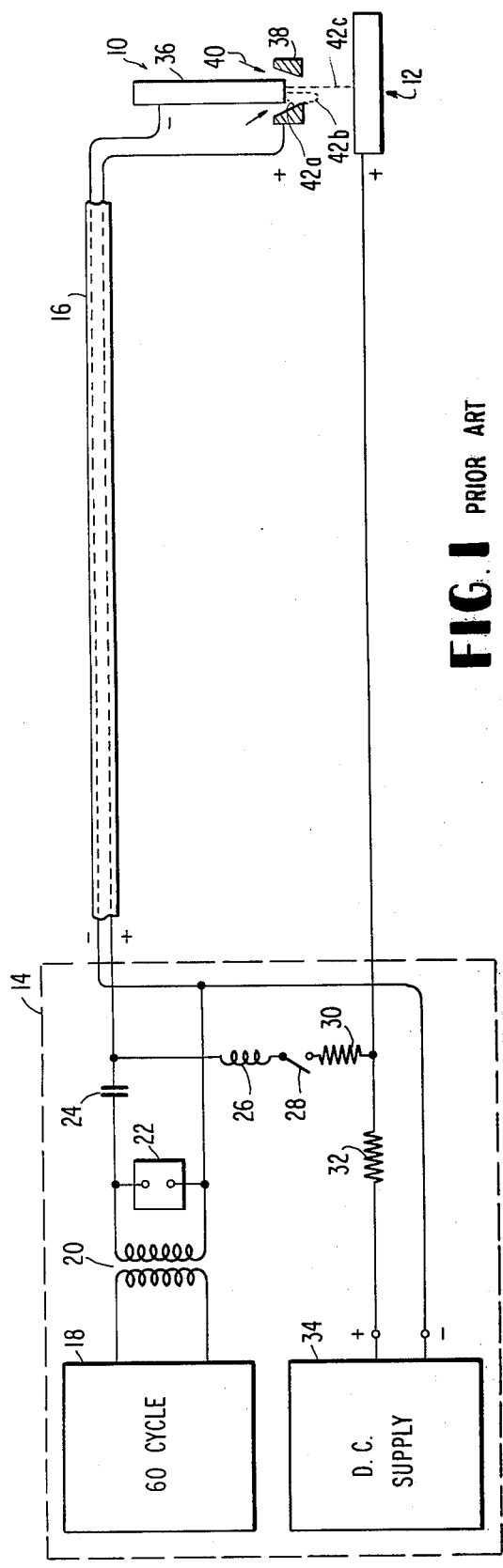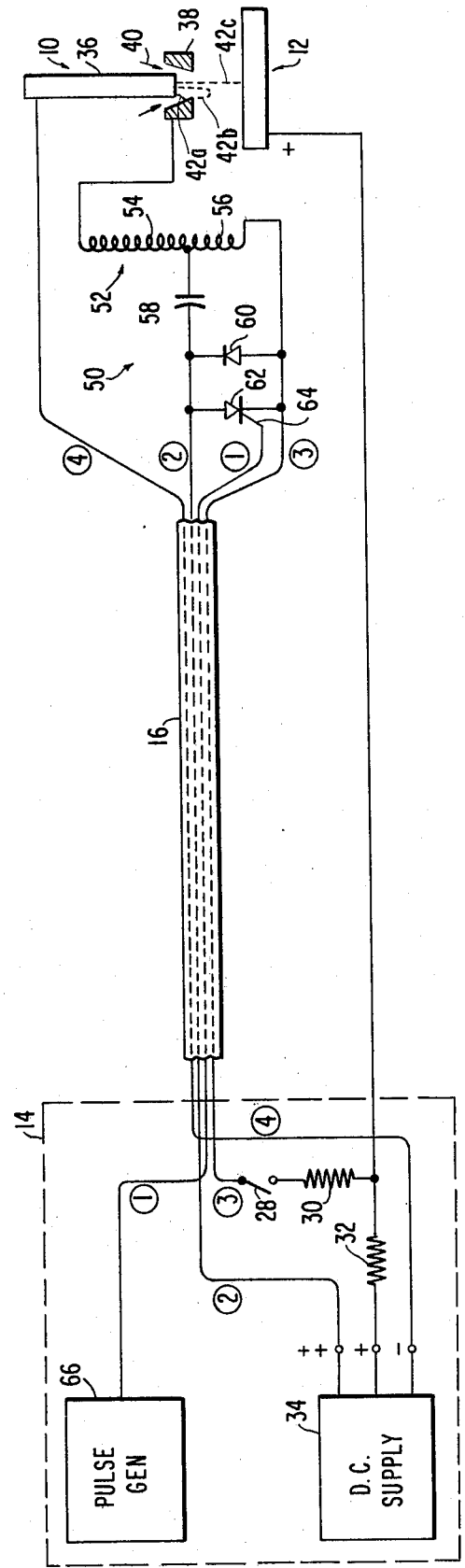

PLASMA TORCH STARTING CIRCUIT

BACKGROUND OF THE INVENTION

The present invention is in the field of plasma torches and in particular is directed to a plasma torch having an improved pilot arc generating circuit.

Plasma torches, otherwise known as electric arc torches, are known in the art for performing operations, such as cutting, welding, etc., on workpieces, and operate by directing a plasma consisting of ionized gas particles towards a workpiece. An example of the conventional single gas plasma torch is illustrated in Hatch, U.S. Pat. No. 3,813,510, assigned to the assignee herein. As the latter patent illustrates, a gas to be ionized, such as nitrogen, is fed through channels in the torch mechanism in such a manner as to swirl in front of the end of a negatively charged electrode. The welding tip which is adjacent the end of the electrode has a sufficiently high voltage applied thereto to cause a spark gap to jump between the electrode and the welding tip, thereby heating the gas and causing it to ionize. A pilot DC voltage between the electrode and the welding tip maintains the pilot arc. The ionized gas in the gap appears as a flame and extends externally of the tip where it can be seen by the operator. The extension of the pilot arc and the flame, which for practical purposes may be considered as being co-extensive, depends upon the power in the gap—i.e., the arc current—as well as the pressure of the gas forced into the gap and out of the torch. The pilot arc provides a source of light which enables the operator to see the proper position for the torch before starting the welding or cutting operation. In actual practice, when the pilot arc is on, a loop-shaped arc extending out of the torch can be seen. As the torch head is brought down towards the workpiece, the pilot arc jumps from the electrode to the workpiece due to the fact that the impedance of the workpiece current path is lower than the impedance of the welding tip current path.

Conventional single gas plasma torches include pilot arc circuits which provide a 20–40 amp. pilot arc current at 100–200 volts across the electrode-tip gap, resulting in an extension of the arc about ¼–½ inch past the welding tip. As a consequence, the torch must be brought to within about ¼–½ inch of the workpiece before the transfer arc jumps to the workpiece. This creates difficulties in the starting of cutting or welding operations.

Also, in the conventional plasma torch circuit, the pilot arc is initiated by a high-frequency signal which is generated in the power supply unit and travels the length of a relatively long cable to the plasma torch. This results in a dissipation of energy. Furthermore, the RF noise created by the conventional spark gap generating circuit can back up into other electrical systems connected to the torch, such as a numerical control machine for controlling patterned movement of the torch, and interfere with the operation of those machines.

SUMMARY OF THE INVENTION

It is therefore an object of the present invention to provide a plasma torch having a pilot arc circuit which does not suffer from the above-mentioned problems.

An object of the invention, as well as other advantages, is provided by a plasma torch pilot arc circuit which produces a pilot arc having a low duty cycle. The circuit is arranged to periodically ignite the pilot arc. In a preferred embodiment, the pilot arc is electrically extinguished substantially instantaneously after ignition. In another embodiment, the pilot arc is extinguished mechanically by the blowing effect of the high-pressure gas between the electrode and the welding tip. The low duty cycle of the pilot arc permits the circuit to generate a large amount of power in the arc without encountering the disadvantages which would normally accompany a large power pilot arc. On the other hand, the large power in the pilot arc creates a longer length of pilot arc, thereby increasing the permissible separation between torch and workpiece needed for creating the transfer arc.

In a preferred embodiment of the invention, a half wave rectified DC voltage is applied between electrode and welding tip via a pilot arc DC circuit. Triggering pulses are applied to a triggering circuit to ignite the pilot arc at selected angles of the half wave rectified voltage.

Other objects, advantages and features of the subject invention are provided by a pilot arc starting circuit wherein the spark gap unit, blocking capacitor and choke coil are eliminated and wherein no RF travels the length of the lead line between the power supply unit and the torch assembly. The subject invention utilizes an auto transformer which performs three functions necessary to the pilot arc starting circuit. The auto transformer generates high voltage pulses to ionize the gas between the torch electrode and welding head. It acts as a choke coil to prevent the high frequency caused in the torch gap, due to the spark created therein, from getting back into the DC leads. Finally, it acts as a DC lead line for passing the DC pilot current, which can go up to 100 amps., between the welding tip and the electrode.

The primary of the auto transformer is connected in circuit with a charging capacitor and an electronically controlled switch means, such as a silicon controlled rectifier. The charging capacitor is charged by the power supply unit, and thereafter the electronically controlled switch is turned on. When the latter occurs, the entire voltage across the capacitor appears instantaneously across the primary of the auto transformer. Due to the large step-up turns ratio between the secondary and primary of the auto transformer, the voltage across the secondary of the auto transformer becomes very high, thereby causing a spark to jump the gap between the torch electrode and the welding tip. The circuitry, including the auto transformer, is placed at the torch assembly end of the cable rather than at the power supply end of the cable.

BRIEF DESCRIPTION OF THE DRAWINGS

FIG. 1 is a schematic illustration of a prior art plasma torch system including the pilot arc starting circuitry.

FIG. 2 is a schematic drawing of one preferred embodiment of the subject invention.

DETAILED DESCRIPTION OF THE PREFERRED EMBODIMENT

Figure 3:
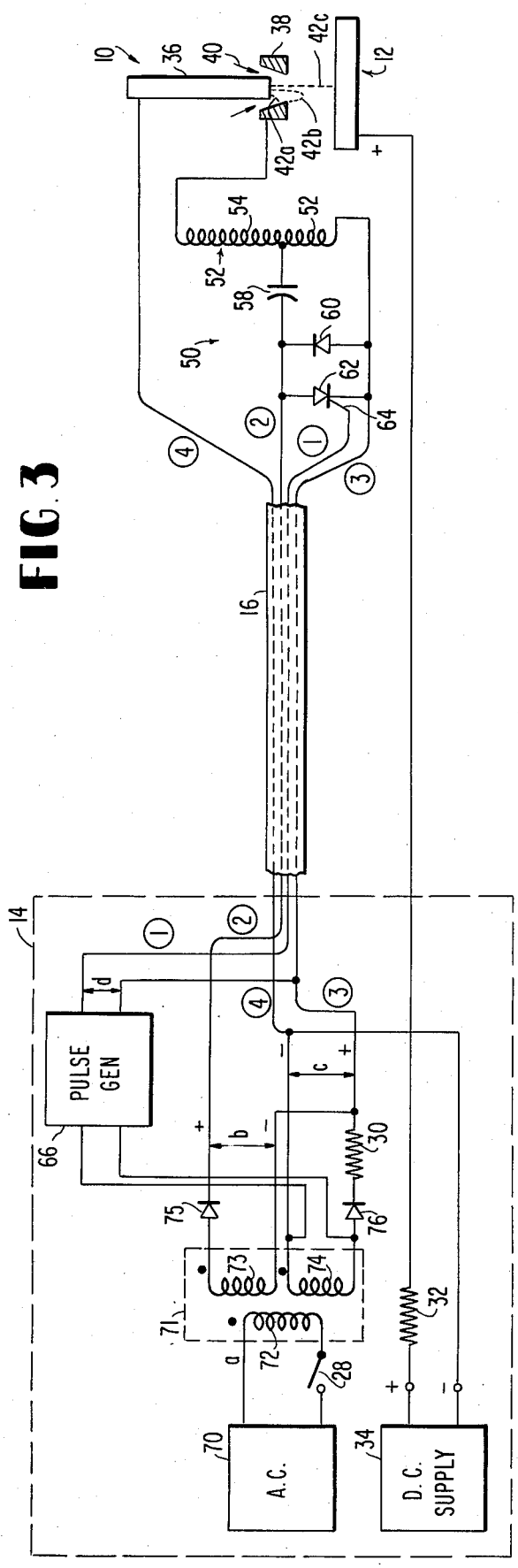
FIG. 3 is a second preferred embodiment of the invention.

Referring now to FIG. 1 which shows the prior art plasma torch system, the torch assembly is illustrated generally at 10 as including an electrode 36 and welding tip 38 and having gas flow therebetween indicated by the arrows 40. It should be understood by anyone of ordinary skill in the art that the torch, in actuality, is much more complicated than that shown in the drawing, but that the simplified illustration is sufficient for an explanation of the problems of the prior art and also of the improvement of the subject invention. An example of a specific torch unit is found in the above-mentioned Hatch U.S. patent. FIG. 1 also indicates a workpiece shown generally at 12, a power unit indicated at 14 and a cable 16 extending between the power unit and the torch. The cable in some devices may be approximately 50 feet in length. As in the case of the torch itself, only so much of the power unit 14 is illustrated as is necessary for an understanding of the prior art and the invention herein. As shown, the power unit 14 includes a 60 cycle source 18, a power transformer 20, spark gap element 22, DC supply 34, DC blocking capacitor 24, AC choke coil 26, switch 28 and path impedances 30 and 32.

In operation, the 60 cycle supply unit provides 60 cycle power across the primary of transformer 20, the latter being then transferred to the transformer secondary with sufficient power to create a spark across the spark gap 22. The transformer 20 is a typical neon sign type of transformer. The spark gap 22 creates what is essentially RF noise; but in this case, a portion of that RF noise is used to create the pilot arc. The radio frequency signal created by the spark gap travels the length of cable 16 and is applied between electrode 36 and welding tip 38. The energy across the gap is sufficient to cause a spark to jump the gap, thereby ionizing the gas flowing therebetween. This results in an initial pilot arc indicated as 42a. The pilot arc is maintained by a DC current which is typically 20-40 amps. and is provided by the DC supply unit 34 via the same leads which carry the RF signal. The blocking capacitor 24 is necessary to prevent the DC signal from supply unit 34 from backing into the AC system, and the choke coil 26 is necessary to prevent the RF from entering into the DC supply circuit. It will be noted that during this time, switch 28 is closed to provide a closed circuit DC pilot loop which includes the positive terminal of DC supply 34, resistor 32, resistor 30, normally closed switch 28, choke coil 26, electrode 36, pilot arc 42a, welding tip 38 and the negative supply terminal of DC supply 34.

Due to the flow of gas indicated at 40, the pilot arc will loop as indicated at 42b. The loop will extend below the welding tip and can be seen by the operator even when wearing a welding mask. As the torch is moved closer to the workpiece 12, the arc jumps from 42b to 42c. It will be noted that the impedance path of the DC circuit including the workpiece 12 is lower than the impedance path of the DC circuit including welding tip 38 because of the presence of impedance 30 in the latter path. It will also be noted that a slight current will continue to flow in the DC circuit which includes the welding tip until such time as switch 28 is opened by means of a foot or hand control switching unit or automatic current sensing relay which opens switch 28 as soon as current flows through workpiece 12.

As pointed out previously, the pilot arc 42b extends about ¼-½ inch past the welding tip, and this in turn means that the torch must be brought so close to the workpiece for the arc to transfer to the workpiece that difficulties are encountered.

Although the pilot arc length can be increased by increasing the pilot arc current, this would normally create more problems than it would solve. First of all, the welding tip would erode much more rapidly, thereby severely shortening the welding tip lifetime. Secondly, the components in the pilot arc circuit, e.g., resistors, capacitors, diodes, wires, would have to be larger, thereby increasing the bulk and cost of the pilot arc circuit.

Another disadvantage of the system shown in FIG. 1 is that the RF signal travels down the long cable 16. This increases the RF noise in the system and can interfere with the proper operation of other electrical equipment connected to the torch. For example, the torch system is often used with and controlled by a numerical control machine—i.e., computer—which moves the torch according to a programmed input to result in a desired cut or weld pattern on the workpiece. If RF noise backs up into the computer, it could wreak havoc with the desired pattern. Finally, the application of the RF down the relatively long lead line results in a substantial loss of high-frequency power.

It should be noted that the above-described system has been standard in the art for many years despite the problems mentioned. It should also be noted that the high-frequency signal generated by the spark gap 22 is not simply provided because only an RF signal can ignite the pilot arc. On the contrary, the 60 cycle power could ignite the power arc directly. The reason why the latter is not practical is because a pilot current is necessary for control of the pilot arc, and if the 60 cycle power were used instead of the RF power to ignite the pilot arc, this would necessitate an impractically large choke coil to separate the 60 cycle power from the DC pilot supply circuit.

It is noted that in several instances the same numerals are used in FIGS. 1, 2 and 3. These numerals designate parts which are identical in all three figures. The features of FIG. 2 which differ from the prior art FIG. 1 are basically the circuit arrangement 50 at the torch assembly end of cable 16 and a few changes in the power supply unit 14. The power supply unit 14 includes a pulse generator 66, and the DC supply 34 includes a third terminal which is indicated by the symbol ++, the function of which will be described hereafter. The + terminal of the DC supply 34 is connected through shunt resistor 32 to the workpiece 12 as in the case of the prior art. Also as in the case of the prior art, the DC pilot current path which includes the electrode 36 and the welding tip 38 further includes the switch 28 and the impedance means 30. The four lead lines from the power supply unit entering the cable 16 are labeled by the circled numbers 1, 2, 3 and 4. This is to indicate that correspondence between the lead lines entering cable 16 at the power supply end and those exiting from the cable 16 at the torch assembly end of the cable 16. The pulse generator 66 provides periodic pulses which may, for example, have the frequency of ten pulses per second. The exact frequency is not critical to the operation of the invention.

The circuit 50 includes an auto transformer 52 having primary 56 and a secondary 54, charging capacitor 58, diode 60 and silicon controlled rectifier 62. The secondary 54 of auto transformer 52 is connected directly to the welding tip 38. Lead line 4 from cable 16, which is the lead line connected to the negative supply terminal of DC supply 34, is connected directly to electrode 36. In a specific example described herein, it is assumed that the DC supply 34 provides 200 volts DC between the terminal indicated "−" and the terminal indicated "+". It is further assumed that the DC supply unit 34 provides 500 volts DC between the terminal indicated "+" and the terminal indicated "++". Consequently, in circuit 50, 500 volts DC exists between lead lines 2 and 3. Because of the polarity of diode 60 and the cut-off condition of SCR 62, capacitor 58 will charge to 500 volts DC.

When a pulse from pulse generator 66 appears at the gate terminal 64 of SCR 62, the latter device becomes a conducting diode. The parallel combination of SCR 62 and diode 60 becomes essentially a short circuit because each device can conduct current in one direction. Consequently, the entire 500 volts across capacitor 58 also must appear across the primary 56 of transformer 52. In the specific example described herein, the turns ratio between the primary and secondary is 1:30. Consequently, the voltage across the secondary will be 15,000 volts, and this will be sufficient to cause a spark to jump between electrode 36 and welding tip 38. It will be noted that when SCR 62 is turned on, the circuit including SCR 62, diode 60, capacitor 58 and primary 56 acts as a ringing circuit having a frequency dependent upon the inductance value of primary 56 and the capacitance value of capacitor 58. In the specific example, if it is assumed that the capacitor is a 0.25 microfarad capacitor, the coil is a ferrite rod coil having 225 turns with a turns ratio of approximately 1:30, and the silicon controlled rectifier is a model 40 RCS 60 made by International Rectifier Company, the riding circuit will have a frequency of 150 kilocycles. It is noted, however, that the ringing circuit will be damped almost instantaneously due to the dissipation of the energy across the torch gap between electrode 36 and welding tip 38.

The auto transformer not only provides the necessary step-up in voltage to initiate the spark necessary for the pilot arc, it also provides a path for the DC pilot supply. The entire DC pilot supply path includes the "+" terminal from supply unit 34, resistors 30, 32, closed switch 28, lead line 3, transformer 52, welding tip 38, pilot arc 42a, electrode 36, lead line 4 and the "−" terminal of DC supply 34. The coil, of course, acts as a substantially zero impedance to the DC current. However, it is noted that most standard coils which are capable of providing the type of step-up voltage needed for igniting the plasma arc would not be able to also carry the relatively large DC pilot current because they would not be designed for that purpose.

The auto transformer also acts as a choke coil to prevent the RF generated by the creation of the torch gap from backing into the DC supply.

In practice, the latter circuit will result in the pilot arc shown at 42a which will then be blown out to a loop pilot arc shown at 42b. Typically, in a torch which is intended for use as a cutting torch as opposed to a welding torch, the gas flow pressure will be sufficiently great so that after a short period of time, e.g., a millisecond or so, the pilot arc will be completely blown out. Thus, from the time the pilot arc is first initiated until the time the pilot arc circuit is disconnected, following transfer of the arc to the workpiece, the pilot arc is intermittent. Stated otherwise, the duty cycle of the pilot arc is less than 100%, which it is in the circuit of FIG. 1. In fact, it is substantially less than 100%. As a result, the instantaneous power can be increased above that used in the prior art, while at the same time reducing the average power below that used in the prior art. The circuit components can be selected, for example, to provide a pilot arc current of about 100 amps. This will result in a much longer arc and will reduce the problem mentioned above. It will be noted that in this embodiment, the desired low duty cycle depends upon the gas blowing out the arc in between pulsed ignitions. This may not be a satisfactory way of reducing the duty cycle for some situations. This is particularly so when the plasma torch is used for welding, wherein the gas pressure may be too low to blow out the pilot arc. A preferred circuit for both periodically initiating and electrically extinguishing the pilot arc is shown in FIG. 3 and will be described subsequently.

It should be noted that although the circuit 50 of FIG. 2 is preferably placed at the torch assembly end of cable 16, it would be possible to place the circuit 50 at the power supply end of cable 16. However, doing so could make it difficult to provide the necessary power to initiate the torch gap because a substantial amount of the power created by discharging the capacitor 58 through the primary of the auto transformer would be dissipated by the load presented by the long lead line 16.

Although the power supply unit 14 of FIG. 2 is indicated as providing separate DC and pulse generators, it will be well understood by anyone of ordinary skill in the art that both the DC power and the pulses can be obtained by conventional circuitry from a basic AC power supply unit. Additionally, the circuit 50 can be operated by rectified AC pulses rather than by standard DC power supply. This alternative is illustrated in FIG. 3.

The circuit of FIG. 3 differs from FIG. 2 in that the pilot arc is extinguished electrically. This is accomplished by replacing the DC pilot voltage applied across the torch gap with a half wave rectified AC voltage, and further by synchronizing the triggering pulses to a desired angle of the half wave rectified voltage.

Figure 4:
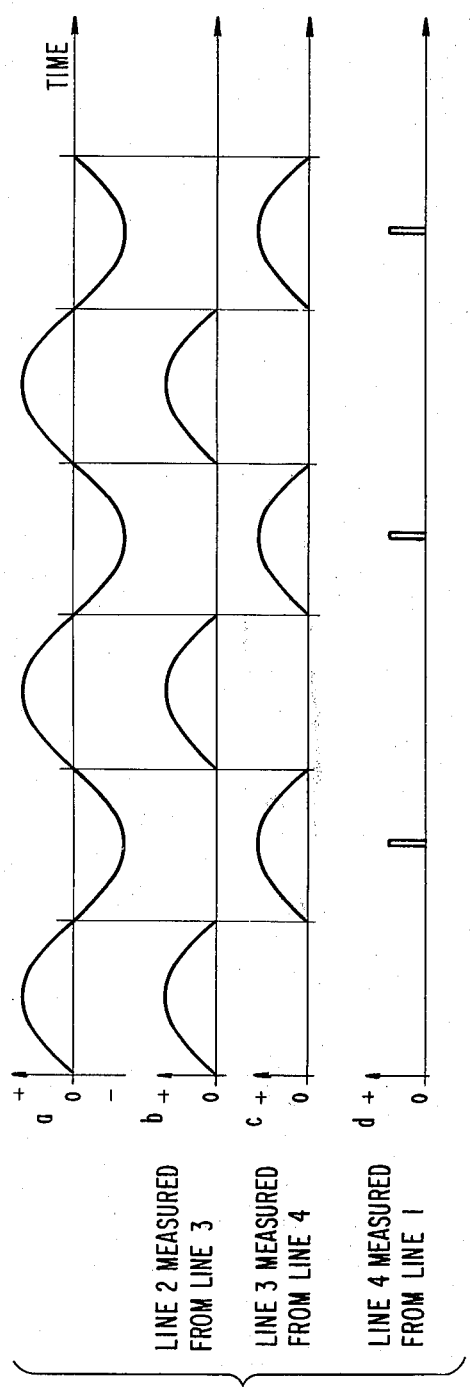
FIG. 4 is a diagram of voltage waveforms appearing at selected locations of the circuit shown in FIG. 3.

In FIG. 4, the waveforms a, b, c and d represent the voltage waveforms occurring in the circuit of FIG. 3 at those points designated as a through d, respectively.

The portions 10, 50 and 16 are the same in FIG. 3 as in FIG. 2. Also, the DC supply circuit 34 provides the DC voltage between the electrode and the workpiece. An AC source 70 is connected through switch 28 to the primary of a transformer 71. The AC source provides a voltage shown in waveform a of FIG. 4 of 50 or 60 Hz, typically. The transformer includes a pair of secondary windings 73 and 74. A diode 76 half wave rectifies the voltage across secondary 74, resulting in voltage waveform c shown in FIG. 4. The latter voltage is applied across the torch gap via leads 3 and 4 in cable 16. A diode 75 half wave rectifies the voltage across the secondary 73, resulting in voltage waveform b of FIG. 4. The latter voltage is applied via leads 2 and 3 in cable 16 to the pilot arc initiating circuit 50. Specifically, the latter voltage charges capacitor 58 to the peak value of the voltage waveform.

The voltage waveform across secondary 74 is also applied to a conventional synchronous pulse generating circuit to provide pulses d of FIG. 4 that are applied via leads 1 and 3 of cable 16 between the gate and cathode of SCR 62. Thus, as can be appreciated from the waveforms of FIG. 4, when the trigger pulse d is applied to the SCR 62, the capacitor 58 will be fully charged with sufficient voltage to ignite the pilot arc in the same manner as described above in connection with FIG. 2. Also at this time, the voltage c across the gap will be at its maximum. One-fourth cycle later, the voltage c will reduce to zero. Some time before that, the voltage c will drop below that level which will sustain the pilot arc and the latter will go out.

The duty cycle for the specific waveforms shown in FIG. 4 will be less than 25%. The duty cycle can be further reduced by delaying the pulses d relative to the peak of waveform c, or by reducing the frequency of the pulses d, or both.

What is claimed is:

1. A plasma torch unit of the type having a power supply, a torch assembly having an electrode, a welding tip and means for providing an ionizable gas therebetween, the improvement comprising a pilot arc ignition circuit comprising first means for periodically applying a sufficiently large voltage between said electrode and said tip to periodically ignite a pilot arc, and second means for extinguishing said pilot arc between said periodic ignitions of said pilot arc, whereby the instantaneous power of said pilot arc is much greater than the average power of the pilot arc, said second means comprising means for supplying a half wave rectified AC voltage between said electrode and said welding tip.

2. A plasma torch unit as claimed in claim 1 wherein said first means for igniting a pilot arc between said electrode and welding tip comprises an auto transformer having a primary and secondary, a charging capacitor and electronically controlled switch means, said switch means, said capacitor and the primary of said auto transformer being connected in a circuit arrangement with each other and to the power supply unit in such a manner that said capacitor is charged by power from said power supply unit and said switch means is rendered conducting by pulses from said power supply unit.

3. A plasma torch unit as claimed in claim 2 further comprising a pilot arc voltage supply circuit comprising said auto transformer, said welding tip, said electrode and the pilot arc established between the welding tip and the electrode.

4. A plasma torch unit as claimed in claim 3 wherein said power supply circuit comprises means for generating said pulses, means for generating said half wave rectified DC voltage and means for synchronizing said pulses and said half wave rectified AC voltage to cause each said pulse to occur at a time when said half wave rectified AC voltage is large enough to sustain said pilot arc.

5. A plasma torch unit as claimed in claim 4 wherein said electronically controlled switch means is a silicon controlled rectifier and wherein said latter means is connected in a circuit loop with said capacitor and the primary of said auto transformer.

6. A plasma torch unit as claimed in claim 5 wherein said first means for igniting said pilot arc further comprises a diode in parallel with said silicon controlled rectifier.

7. A plasma torch as claimed in claim 6 wherein said auto transformer comprises a wire capable of carrying an average DC current in excess of 20 amps. wrapped around a ferrite core, and having a primary to secondary turns ratio of at least 1:20.

8. A plasma torch unit as claimed in claim 3 further comprising a lead cable for connecting the power supply to the torch assembly, said power supply comprising means for generating a pilot supply voltage, means for generating a capacitor charging voltage and means for generating periodic pulses, and wherein said lead cable comprises plural connector means for connecting said pilot supply voltage to said pilot arc voltage supply circuit, for connecting said capacitor charging voltage to said loop circuit and for connecting said periodic pulses to said electronically controlled switch means.

* * * * *